United States Patent
Kurtz et al.

(10) Patent No.: US 7,451,655 B2
(45) Date of Patent: Nov. 18, 2008

(54) HIGH TEMPERATURE PRESSURE SENSING SYSTEM

(75) Inventors: Anthony D. Kurtz, Saddle River, NJ (US); Wolf S. Landmann, Fair Lawn, NJ (US); Alexander A. Ned, Wayne, NJ (US)

(73) Assignee: Kulite Semiconductor Product, Inc., Leonia, NJ (US)

( * ) Notice: Subject to any disclaimer, the term of this patent is extended or adjusted under 35 U.S.C. 154(b) by 0 days.

(21) Appl. No.: 11/709,639

(22) Filed: Feb. 22, 2007

(65) Prior Publication Data
US 2008/0028863 A1    Feb. 7, 2008

Related U.S. Application Data

(62) Division of application No. 11/234,724, filed on Sep. 23, 2005, now Pat. No. 7,231,828.

(51) Int. Cl.
*G01L 9/06* (2006.01)
(52) U.S. Cl. ........................................... 73/727
(58) Field of Classification Search ........... 73/700–756; 361/283.1–283.4
See application file for complete search history.

(56) References Cited

U.S. PATENT DOCUMENTS

| | | | |
|---|---|---|---|
| 4,672,354 A | 6/1987 | Kurtz et al. | |
| 5,286,671 A | 2/1994 | Kurtz et al. | |
| 5,614,678 A | 3/1997 | Kurtz et al. | |
| 5,955,771 A | 9/1999 | Kurtz et al. | |
| 6,718,830 B1 * | 4/2004 | Johnson | 73/754 |
| 6,763,719 B2 * | 7/2004 | Hatano et al. | 73/514.33 |
| 7,278,319 B2 * | 10/2007 | Johnson | 73/721 |

* cited by examiner

*Primary Examiner*—Edward Lefkowitz
*Assistant Examiner*—Jermaine Jenkins
(74) *Attorney, Agent, or Firm*—The Plevy Law Firm

(57) ABSTRACT

A high temperature pressure sensing system (transducer) including: a pressure sensing piezoresistive sensor formed by a silicon-on-insulator (SOI) process; a SOI amplifier circuit operatively coupled to the piezoresistive sensor; a SOI gain controller circuit including a plurality of resistances that when selectively coupled to the amplifier adjust a gain of the amplifier; a plurality of off-chip contacts corresponding to the resistances, respectively, for electrically activating the corresponding resistances and using a metallization layer for the SOI sensor and SOI ASIC suitable for high temperature interconnections (bonding); wherein the piezoresistive sensor, amplifier circuit and gain control circuit are suitable for use in environments having a temperature greater than 175 degrees C. and reaching between 250° C. and 300° C., and wherein the entire transducer has a high immunity to nuclear radiation.

1 Claim, 4 Drawing Sheets

GAIN= 40---61

GAIN= 61---76

GAIN= 76---94

GAIN= 94---130

GAIN= 130+

HIGH TEMPERATURE PRESSURE SENSING SYSTEM

RELATED APPLICATIONS

This application is a divisional of U.S. patent application Ser. No. 11/234,724, entitled HIGH TEMPERATURE PRESSURE SENSING SYSTEM, filed Sep. 23, 2005, now U.S. Pat. No. 7,231,828 the entire disclosure of which is hereby incorporated by reference as if being set forth in its entirety herein.

FIELD OF THE INVENTION

The present invention relates generally to pressure sensors, and more particularly to pressure sensors suitable for use at high operating temperatures and employing silicon-on-insulator (SOI) architecture.

BACKGROUND OF THE INVENTION

Pressure is one of the most widely measured physical parameters, having significant importance in widely varying fields in industry, technology and science. Systems for measuring pressures at high operating temperatures have particular needs.

Conventional high temperature pressure-sensing transducers are often limited in operation, as the overall pressure sensing system, which includes associated electronics, is limited to relatively low operating temperatures.

Conventional electronic conditioning units used with pressure transducers are typically limited to operating temperatures below around +125° C. (+257° F.). While carefully designed circuits may be capable of operating up to around +175° C. (+347° F.), owing to very complicated process and design optimization with significant performance sacrifices, systems that operate at even higher temperatures are desired for certain applications.

It is desirable to provide a pressure sensing system (transducer) suitable for use at high operating temperatures, greater than +125° C. (+257° F.) and even +175° C. (+347° F.). For added functionality and versatility, the transducer should incorporate a conditioning unit to generate a high level output, properly normalized and compensated. Also the conditioning unit should incorporate means to reduce or cancel the effects of the variations of the input voltage, allowing the operation of the transducer over a wide range of input voltages.

Temperature limitations of conventional pressure sensing systems result from leakage currents between individual components of an integrated circuit—e.g., between transistors and resistors, and the bulk substrate. Circuit components are typically isolated from one other and the substrate by reverse polarized p-n junctions. While the reverse bias current of these junctions is typically low at room temperature, this current tends to double about every 6° C. As a result, above certain temperatures, the leakage currents become too high and render the circuit unsuitable. This temperature limit is typically around +175° C. (+347° F.).

The operating temperature of the transducer can be further increased by the use of Complementary Metal-Oxide Semiconductor (CMOS) devices for the signal conditioning unit. CMOS devices are majority carrier type semiconductors, which enables them to operate at higher temperature than bipolar linear circuits, based on p-n junctions and minority carriers.

SUMMARY OF THE INVENTION

A high temperature pressure sensing system (transducer) including: (i) a pressure sensing piezoresistive sensor formed by a silicon-on-insulator (SOI) process; (ii) a SOI CMOS electronic circuit (conditioning unit) operatively coupled to the piezoresistive sensor; (iii) ancillary circuitry connected to the conditioning unit to provide compensation and normalization of the transducer's output. The electronic interface is implemented as an application Specific Integrated Circuit (ASIC). The compensation and normalization of the transducer is accomplished by connecting different resistors and jumpers to the electronic interface.

BRIEF DESCRIPTION OF THE FIGURES

Understanding of the present invention will be facilitated by considering the following detailed description of the preferred embodiments of the present invention taken in conjunction with the accompanying drawings, in which like numerals refer to like parts, and.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in typical pressure sensing systems and methods of making and using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

According to an aspect of the present invention, a high temperature pressure transducer may comprise an integral electronics amplifier assembly incorporated into a single chip using Silicon. On Insulator (SOI) structure-base circuits and an SOI pressure sensor chip. "Chip", as used herein, generally refers to a common semi-conducting substrate on which an integrated circuit is embedded. The SOI based circuit will operate at much higher temperatures than other conventional electronics. The sensor, which may incorporate SOI based piezoresistors, in conjunction with the SOI electronics, is configured as a complete pressure transducer with amplified output capable of operating at higher temperature than conventional systems.

Figure 1:
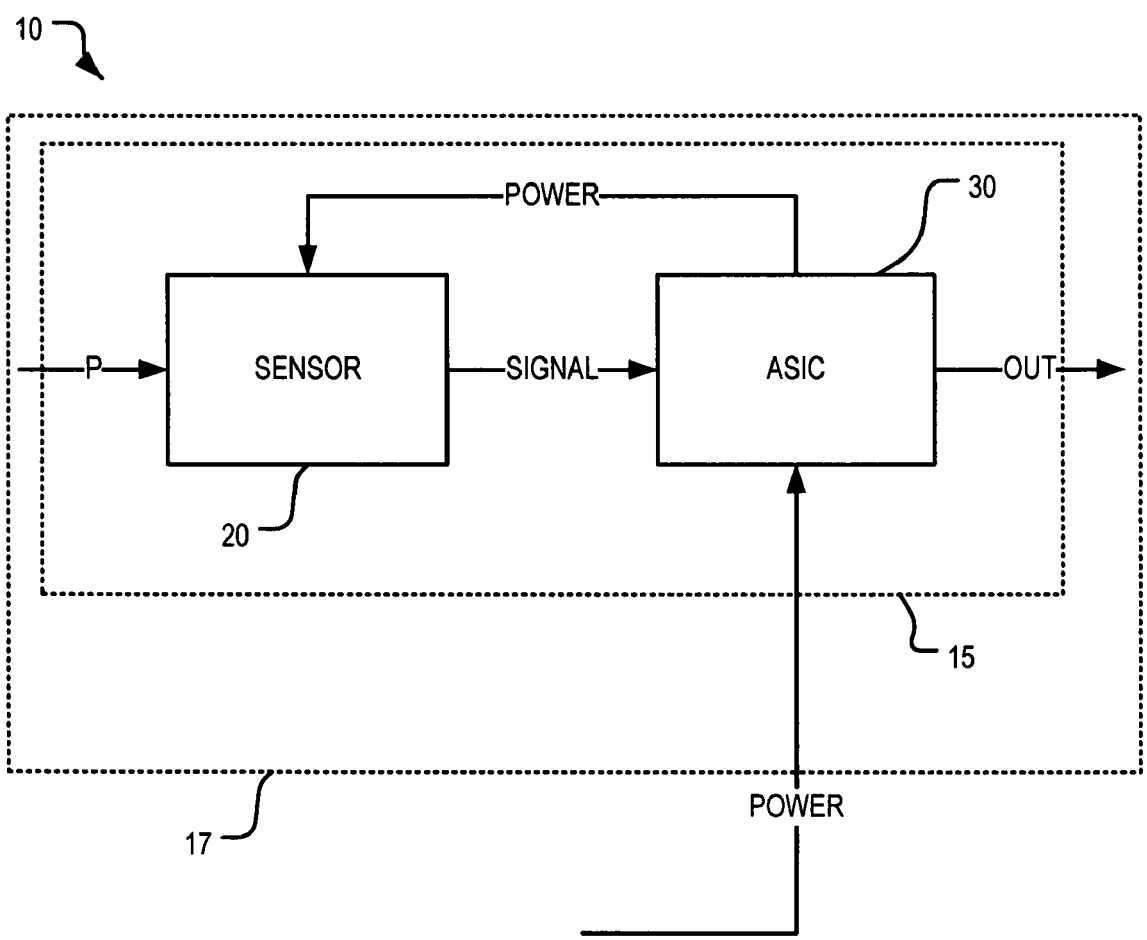
FIG. 1 illustrates a block diagram of a system according an an aspect of the present invention.

Referring first to FIG. 1, there is shown a block diagram of a pressure sensing system 15 suitable for use in a high temperature environment. System 15 generally includes sensor 20 and a signal conditioning unit. The main component of the signal conditioning unit is an application specific integrated circuit (ASIC) 30. The ASIC 30 is biased by an external power source (not shown), and in turn biases sensor 20. In response thereto, sensor 20 provides an output signal indicative of a pressure P applied to sensor 20. Responsive thereto, the signal conditioning unit provides a signal output indicative of the applied pressure P. By way of non-limiting example only, the environment in which the transducer operates may take the form of a high temperature environment, such as an environment in excess of 175 deg. C.

According to an aspect of the present invention, in order to tolerate environment 15, sensor 20 may take the form of a silicon-on-insulator (SOI) based device. Such a device may be fabricated in accordance with the teachings of U.S. Pat. No. 5,286,671 entitled "Fusion Bonding Technique For Use In Fabricating Semiconductor Devices" issued on Feb. 15, 1994 to A. D. Kurtz et al., and assigned to the assignee hereof. The entire disclosure of U.S. Pat. No. 5,286,671 is hereby incorporated by reference herein. The '671 patent shows a method of bonding a first silicon wafer to a second silicon wafer and comprises the steps of diffusing a high conductivity pattern into a surface of a first semiconductor wafer, etching a portion of the surface to raise at least a portion of the pattern, providing a second semiconductor wafer having an insulating layer of a silicon compound disposed thereon, contacting the surface of the pattern to the insulating layer, and bonding the first and second semiconductor wafers at an elevated temperature. The insulating ($SiO_2$) layer dielectrically isolates the entire piezoresistive network from the underlying substrate, thus completely eliminating any PN Junctions in the device structure. These $SiO_2$ layers are capable of providing electrical insulation up to and above 700° C. Once the bond is performed, the non-doped part of the pattern wafer is selectively removed via chemical processing. In effect, the piezoresitive high conductivity gages are transferred onto a dielectrically isolated carrier wafer in which the pressure sensing diaphragm is then micromachined.

Sensor 20 will incorporate a Wheatstone bridge configuration of a plurality of piezoresistors disposed upon a pressure deflectable diaphragm. Such a configuration is disclosed in U.S. Pat. No. 5,614,678, entitled "High Pressure Piezoresistive Transducer", issued to A. D. Kurtz, et al. which is commonly assigned to the assignee hereof. The entire disclosure of U.S. Pat. No. 5,614,678 is also hereby incorporated by reference herein. In such configuration, the piezoresistors measure the stress in the silicon diaphragm which is a direct function of the pressure of the media. In this high temperature pressure sensing device the electrical connections between the sensing element and the packaging "header" are established via wirebonds. Alternatively, the leadless SOI technology disclosed in U.S. Pat. No. 5,955,771 entitled "Sensor For Use In High Vibrational Applications and Methods of Fabricating Same", issued to A. D. Kurtz, et al. utilizes the same fabrication techniques as described in U.S. Pat. No. 4,672,354, but with the sensing chip packaged in a way that eliminates the use of wirebonds. In this SOI leadless construction, the leadless sensor is mounted directly on top of the header with the header pins protruding into the contact regions directly adjacent to the metallized contacts on the sensor chip. A high temperature pyroceram is used to affix the chip on to the header while a high temperature glass metal frit is used to provide the electrical connection between the sensing chip and the header. Both the conductive and the non-conductive pyrocerams are designed to fire at the same time. Both the leadless (SOI) and the wirebonded sensor (SOI) technologies are capable of high temperature operability.

Referring again to FIG. 1, ASIC 30 is used to bias sensor 20, to receive the output thereof, and to amplify the sensor's output. Sensor 20 may be electrically interconnected with the signal conditioning unit using any suitable medium, such as high temperature conductors and solder, for example.

A typical SOI CMOS structure may be implemented wherein all components in n-channel and p-channel transistors, dioxides, capacitors, resistors, etc, are fabricated on a insulating layer of $SiO_2$. The fabrication process consists of producing a thin, single crystalline layer of silicon separated from the substrate by a high quality $SiO_2$ layer either: 1) by using an oxygen implantation (SIMOX) approach where the implanted oxygen creates an insulating $SiO_2$ layer some distance (a few microns) from the top surface, thus establishing a thin silicon layer isolated from the substrate, or 2) by fusion bonding an oxidized substrate wafer to a second wafer followed by selective etching of the second wafer to leave only a thin, high quality, layer of silicon, over the $SiO_2$ layer on the substrate. The process for the selective etching of the second (device) silicon wafer can utilize either 1) a conductivity selective etching process, 2) a lap and polish process, or 3) a hydrogen implant and micro splitting process. Once the Silicon-On-Insulator wafers are produced, selective doping, patterning, additional film growing and other semiconductor processing can be used to fabricate different features and components in the device: With controlled doping, the appropriate drain and source regions in respective transistors are produced. A high quality oxide layer is then grown to serve as a gate oxide, over which a polycrystalline P-type silicon will be deposited to act as a gate material. The same polycrystalline material can also be used to form all the necessary resistors within the ASIC. In this process, unlike in the previously used bipolar technology where Ni—Cr having very low thermal temperature coefficient of resistance typically are used, resistors cannot be made as metal layers. As a result, the utilized polycrystalline resistors have a relatively large TCR of about 1500 ppm/° C. orders of magnitude higher than that of metal film resistors. Circuit techniques were developed, as described below, to eliminate the effects of the high TCR.

With the SOI ASIC approach all associated components within the devices are dielectrically isolated from each other and from the substrate, thus eliminating the effects of leakage currents and substrate parasitic capacitance. Latch-ups, typically associated with bulk CMOS designs, are also eliminated. The use of SOI enables the fabrication of very stable ASICs operational up to and above 300° C., suitable for both high voltage and low voltage application. Through variation in processing (by adjusting various film and oxide thicknesses, and by adjusting the doping characteristics) different types of MOS designs can be implemented as part of the SOI ASICs. For example, one can implement either a partially depleted, or fully depleted type structures operational in either: 1) enhancement, 2) accumulation or 3) inversion modes, with each of the modes carrying respective advantages for specific applications. By using a CMOS topology, operational drawbacks associated with bipolar circuits may also be mitigated.

The resulting SOI ASIC chip is then mounted on a header and appropriate leads are used to interconnect metallized pads on the ASIC chip to the pins of the header. The preferred method of forming the interconnect is with the use of ultrasonic ball bonding of gold wires. In the traditional low temperature ASIC the contact metallization is typically a thin aluminum film of approximately 2,000-6,000 Å. However, at temperatures above 200° C., the interaction of the gold wire with the aluminum film leads to the formation of intermetallic compounds which deteriorate the reliability of the bond (a phenomenon referred to as purple plague). For high temperature operation (in excess of 200° C.), therefore, to continue to use an ultrasonic gold "ball bonded" wire for the interconnection, a different metallization scheme must be employed. For this case, the metallization is comprised of three layers.

The first layer is the Tungsten thin film which acts as an ohmic contact and a component to component interconnection. This film is typically sputtered or can be otherwise deposited. The second, titanium, layer acts as a barrier and an adhesion promoting layer between the ohmic contact layer and the top layer metal. The third layer is the platinum thin film which will act as a layer to which the gold wires are ball bonded to. The top two layers will only be present in the contact areas where the wire bonds will be attached. Gold wire bonds to Ti/Pt metallization eliminates the failure mode associated with purple plague and enables device operability at high temperatures.

As an unanticipated advantage, it has also been realized that a SOI structure provides a strong immunity to nuclear radiation, e.g., it is radiation hardened. This immunity is due to the use of p+ or n− degenerated material (i.e. highly doped), whereas p-n junctions are strongly affected by nuclear radiation. Where sensor 20 and ASIC 30 use SOI structures, the resulting system 10 may withstand much higher nuclear radiation doses than conventional types of semiconductor based sensor devices.

Thus, it has been discovered to be advantageous in certain circumstances to combine a SOI piezoresistive sensor 20 with SOI electronics implemented as ASIC 30, to provide a high temperature, high level output transducer.

Figure 2:
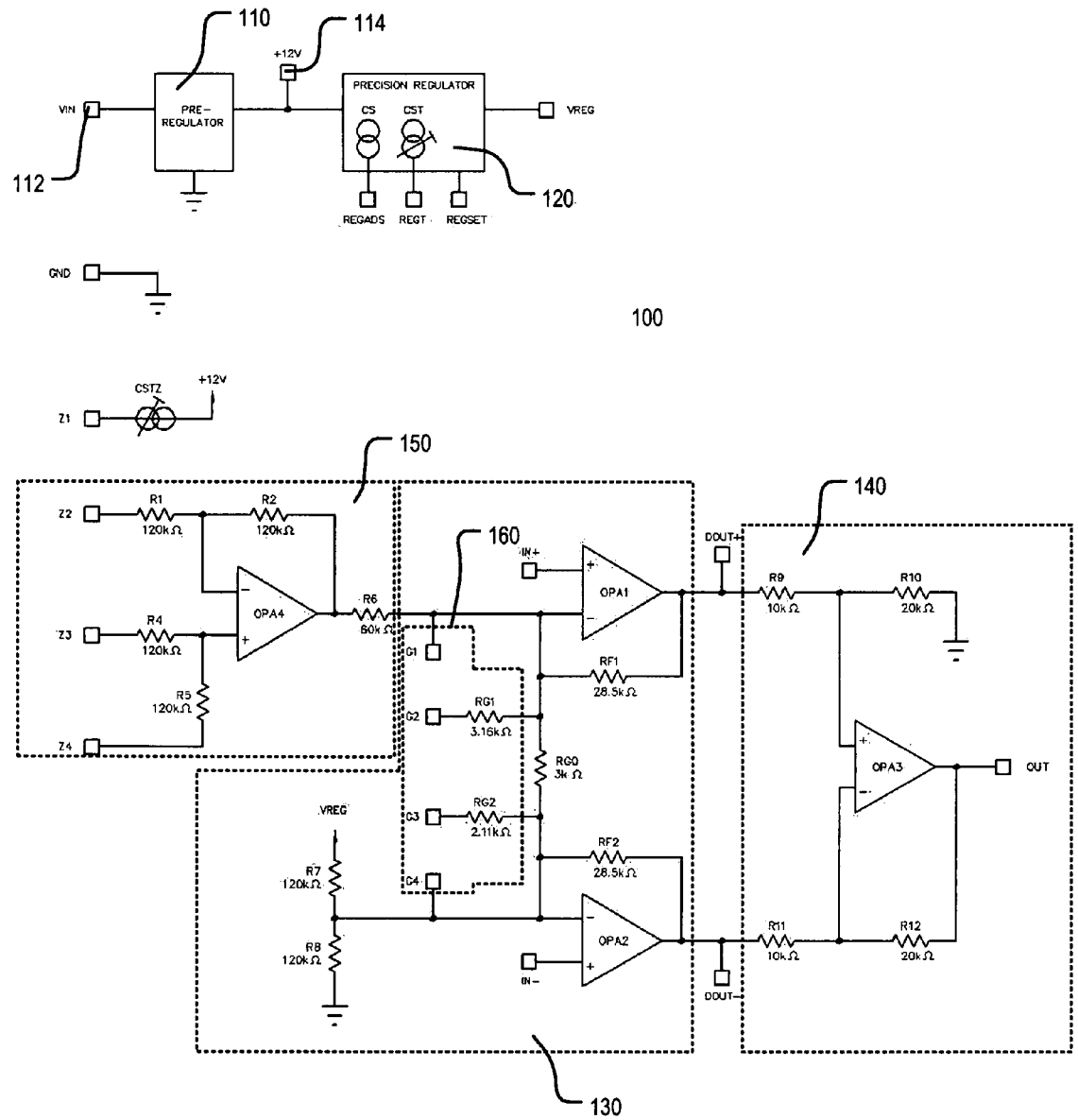
FIG. 2 illustrates a block diagram of an application specific integrated circuit (ASIC)
Figure 3:
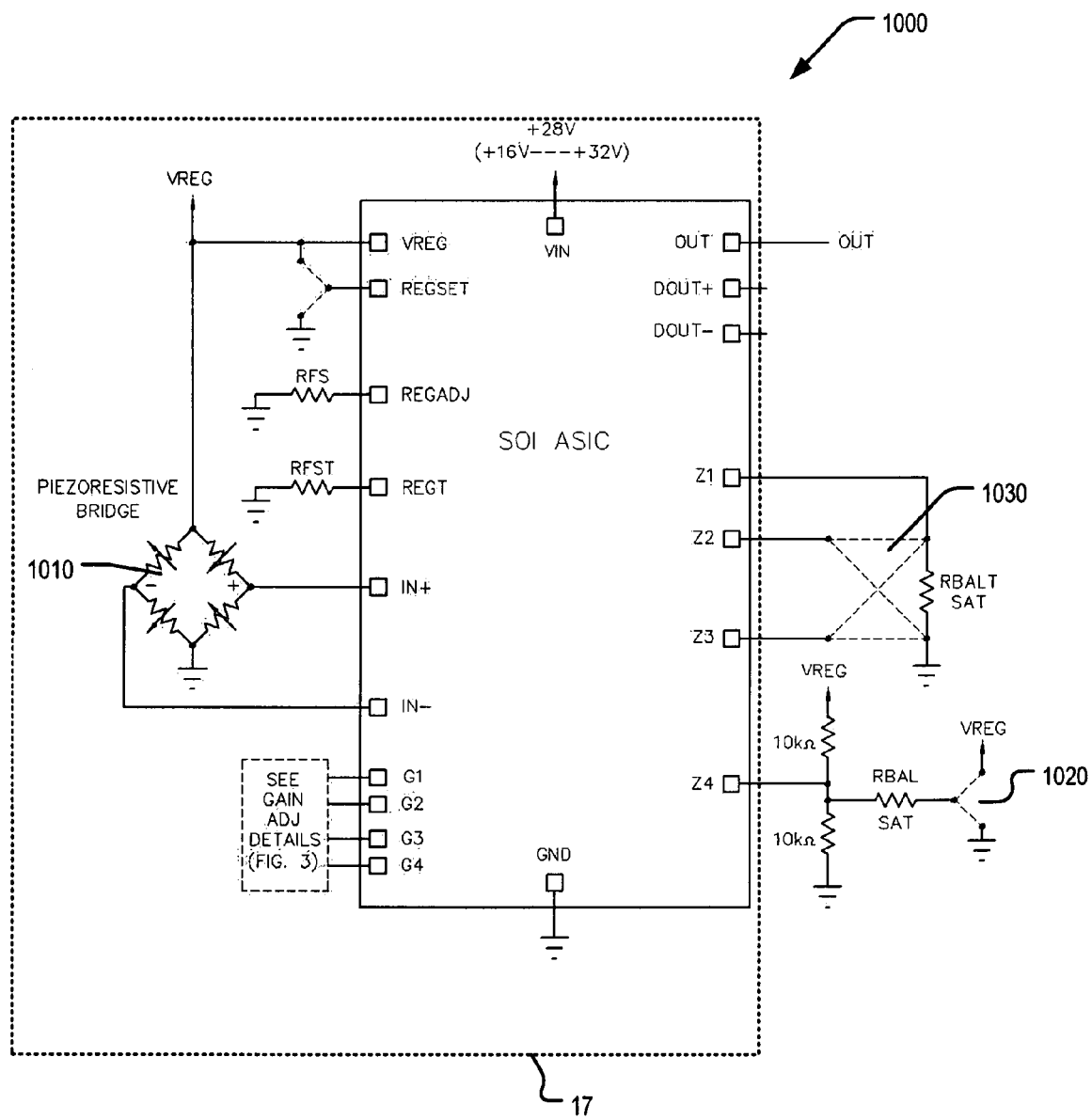
FIG. 3 illustrates a block diagram of a pressure sensing system which incorporates the ASIC of FIG. 2.

Referring now to FIG. 2, there is shown a block diagram of the components of an application specific integrated circuit (ASIC) 100 suitable for use as ASIC 30 of FIG. 1. FIG. 3 illustrates a block diagram of a pressure sensing system 1000 according to an aspect of the present invention, and incorporating ASIC 100 of FIG. 2. Sensor 20 may take the form of the Piezoresistive Wheatstone Bridge 1010 in FIG. 3.

ASIC 100 generally includes a pre-regulator 110, precision regulator 120, instrumentation amplifier 130, output stage 140, offset control stage 150 and gain control stage 160. According to an aspect of the present invention, all of these components may be implemented using an SOI architecture on a common substrate.

Generally, pre-regulator 110 provides a substantially fixed voltage 114 as an output, such as about +12 VDC, when supplied with an unregulated input voltage 112, such as between about +15 VDC and +32 VDC. The output voltage 114 of pre-regulator 110 may be used to supply the remainder of system 1000. Pre-regulator 110 may take the topology of conventional DC voltage regulator: a voltage reference, an operational amplifier, a pass transistor, and a negative feedback network.

Precision regulator 120 has an input for receiving voltage 114, generated by the pre-regulator 110. Responsively thereto, precision regulator 120 generates a precise, stable voltage VREG used to supply power to the pressure sensing apparatus, e.g., piezoresistive bridge 1010 (FIG. 3). Pre-regulator 110 improves the power supply rejection rate (PSRR) of precision regulator 120 as well as the PSRR of incorporated amplifiers. The value of the output voltage VREG is selectable to predetermined levels, such as 9 VDC, 7 VDC or 5 VDC using conventional methodology (e.g., in response to an external pin REGSET connected either to ground, VREG or open). Precision regulator 120 may also provide for fine adjustment of the output voltage VREG and a controllable positive temperature coefficient of the output voltage. These controls may be implemented by a conventional fixed current source (CS) and a conventional temperature dependent current source (CST), as well as two external fixed, Selected At Test (SAT) resistors RFS and RFST (FIG. 3), for example. The fine adjustment of the voltage may be used to provide precise gain control (span) of the complete transducer, while the temperature dependent control may be used to compensate for thermal effects on the span.

Instrumentation amplifier 130 serves to amplify the output of bridge 1010 (FIG. 3). In the illustrated embodiment, instrumentation amplifier 130 is implemented with operational amplifiers OPA1 and OPA2 and a negative resistive feedback network including resistors RF1, RF2 and RG0. The output of the piezoresistive bridge 1010 is applied to the non-inverting inputs of the operational amplifiers OPA1 and OPA2. Bridge 1010 is supplied with the voltage VREG generated by the precision regulator 120. In this illustrated embodiment, the amplifier network provides a fixed minimum gain of about 40. The negative input terminal of OPA1 is also coupled to offset control stage 150 and gain control stage 160. The negative input terminal of OPA2 is also connected to gain control stage 160 and through a 120 kΩ/120 kΩ voltage divider R7/R8 to VREG and ground. The outputs of OPA1 and OPA2 (the output of instrumentation amplifier 130), DOUT+, DOUT−, respectively, are applied to output stage 140.

Output stage 140 provides a single-sided output signal OUT. For example, OUT may take the form of a 0.5 VDC-5 VDC signal varying with applied pressure P (FIG. 1), where the difference between DOUT+, DOUT− takes the form of an about 0 VDC-2.5 VDC signal varying with applied pressure P (FIG. 1). Thus, output stage 140 serves to convert a differential output signal to a single-ended output signal. In the illustrated embodiment, output stage 140 includes an operational amplifier OPA3 and associated resistive network, providing a gain of 2. The gain is the ratio of feedback resistor R12 to the input resistor $$R11\left(\frac{10k\Omega}{20k\Omega} = 2\right).$$

In the illustrated embodiment, DOUT+, DOUT− are resistively coupled to positive and negative input terminals of OPA3 via resistors R9, R10, respectively. Resistors R9, R11 are each on the order of about 10 kΩ. The resistive network of output stage 140 also includes negative feedback resistor R12, coupling an output of OPA3 to the negative input terminal of OPA3. The positive input terminal of OPA3 is resistively coupled to ground through resistor R10. In the illustrated case, resistors R10, R12 are on the order of about 20 kΩ each, and the output of OPA3 provides the single-sided output signal OUT.

Offset control 150 generally includes an operational amplifier OPA4, which provides a controllable fixed offset as well as a temperature dependent offset. In the illustrated embodiment, a selected at test (SAT) resistor RBAL (FIG. 3) is used to control the fixed offset, while another SAT resistor RBALT (FIG. 3) controls the temperature dependent offset. In the illustrated embodiment, the output of OPA4 is resistively coupled to gain control stage 160 and the negative input terminal of OPA1 though resistor R6, which has a resistance of around 60 kΩ. OPA4 has a negative input feedback resistor R2, which in the illustrated case is on the order of about 120 kΩ. The negative input terminal of OPA4 is also resistively coupled to a contact Z2 via a resistor R1, which in the illustrated case is on the order of about 120 kΩ. The positive terminal of OPA4 is resistively coupled to contacts Z3, Z4 through resistors R4, R5, respectively. In the illustrated embodiment, resistors R4, R5 are each on the order of about 120 kΩ.

In this arrangement, the output of OP4 is the algebraic sum of three voltages: (i) a fixed voltage equal to VREG/2; (ii) a positive or negative adjustable voltage dependent determined by RBAL; and, (iii) a positive or negative temperature dependent voltage dependent determined by RBALT. This voltage is applied through resistor R6 to gain contact G1 of gain control stage 160 (FIG. 2). A second gain contact G4 of gain control stage 160 is connected to the 120 kΩ/120 kΩ R7/R8 voltage divider, which has a Thevenin equivalent of VREG/2 and 60 kΩ. This divider cancels the effect of the fixed voltage of VREG/2 component of the OPA4 output, leaving only the second and third components of this voltage to affect the output of the instrumentation amplifier 130 and output stage 140. These two components provide compensation and normalization of the offset and offset shift of system 10 (FIG. 1).

The temperature dependent offset is generated by current source CSTZ (connected to contact Z1), which has a defined positive temperature coefficient. This current is passed through the resistor RBALT, and the voltage drop developed across this resistor is applied to the terminals Z2 and Z3. This connection is made either with Z3 connected to ground and Z2 to the top of resistor RBALT, or vice-versa, by means of the jumpers 1030. This selective connection determines the polarity of the temperature dependent offset. The absolute value of the temperature dependent offset is determined by the value of the resistor RBALT. The connection mode and the value of the resistor RBALT are Selected At Test (SAT) as a function of the individual characteristics of the piezoresistive sensor 1010 and ASIC interface.

The polarity of the adjustable offset is set by selectively connecting the resistor RBAL either to ground or VREG (FIG. 3, reference numeral 1020). The value of the adjustable offset is determined by the value of the resistor RBAL. The connection and value of the resistor RBAL are Selected At Test (SAT) as a function of the individual characteristics of the piezoresistive sensor 1010 and ASIC interface.

Such an offset control provides for certain advantages. First, offset control is independent of gain control, providing for separate zero and span configurations. Second, such an offset control is independent of the thermal coefficients of internal ASIC resistors. Third, such an offset control provides for independent offset and offset shift adjustments.

A major problem encountered when using present state-of-the-art high temperature SOI CMOS devices is due to the very large temperature coefficient of the resistors (TCR). This coefficient, typically around +1500 ppm/° C., is due to the use of heavily doped material to implement the resistors. Previous technologies, limited to lower temperatures, use Nickel-Chromium resistors, which have a much lower TCS, of about 200 ppm/° C., or even less.

Several characteristics of the signal conditioning unit, e.g. the gain, are determined by ratio of resistors. In previous implementations, some of these resistors are internal to the ASIC 30 and one is external, Selected At Test (SAT). The external SAT resistor is a metal film type, with a very low TCS, usually less than 100 ppm/° C. This method however can be used only if the TCR of all the resistors is either very low, or at least the same (i.e. matched) such that the gain will not change over temperature.

The effect of the high TCR of the internal to the ASIC resistors appears when the same techniques of setting the gain as in the previous technologies are used. By using the same method, the resulting gain will have an inordinately high temperature coefficient, of up to 15% per 100° C. This effect is due to the mismatch of the TCR of the internal to the ASIC resistor(s) and the external resistor.

In order to mitigate the effect of the very large temperature coefficient of the internal resistors, of about +1500 ppm/° C., a different method os gain setting was implemented. The new method uses two additional internal resistors in the ASIC, RG1 and RG2, connected to the gain pins G2 and G3. Although these resistors have large temperature coefficients, like the other internal resistors, their tracking over temperature is good, resulting in stable gains with temperature.

Figure 4:
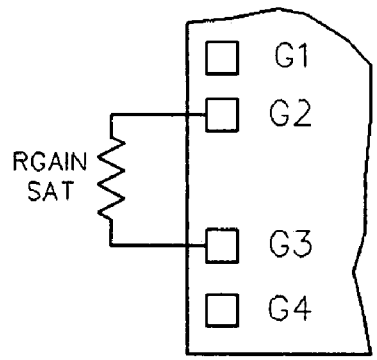
FIG. 4 illustrates connections for achieving different preset gains.
Figure 4:
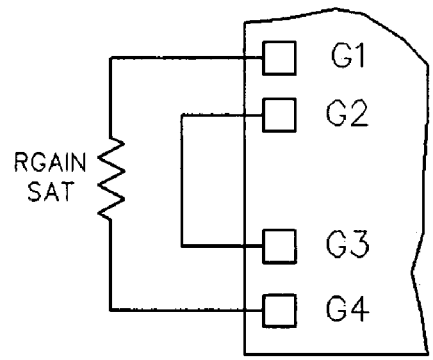
Figure 4:
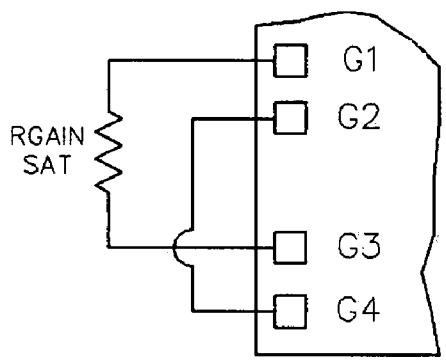
Figure 4:
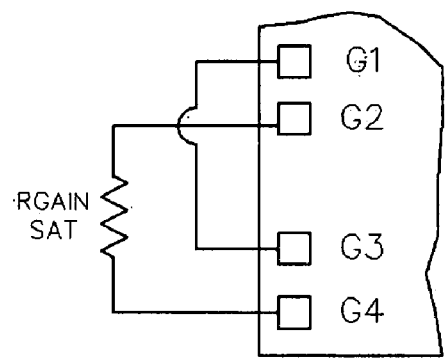
Figure 4:
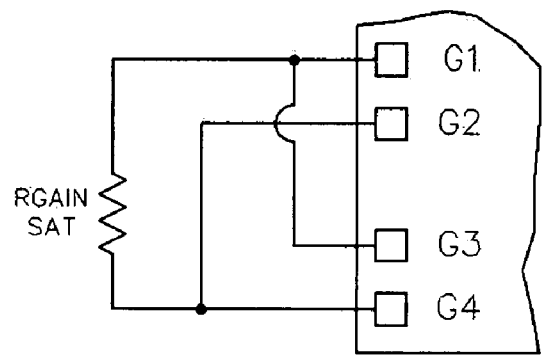

In the illustrated embodiment, connecting the four gain pins G1, G2, G3 and G4 in different ways sets the gain of the instrumentation amplifier. The different connections and the resulting gains are shown in FIG. 4. Contacts G2, G3, and hence resistors RG1 and RG2, can be left unconnected, connected in parallel with RG0, either individually, or both in parallel, or both in series. This way a total of five fixed (coarse adjustment) gains may be provided; 40×, 61×, 76×, 94× and 130× in the illustrated case. As these gains are determined by ratios of internal resistors only, and as the resistors are well matched, the resulting gains will be very stable over temperature. As will be understood by those possessing an ordinary skill in the pertinent arts, this allows for normalization of the output of the transducer for individual bridges 1010.

A fine adjustment of the full scale output can be effected either by fine adjusting VREG as described above, or by adding external SAT gain resistor(s) between select ones of contacts G1, G2, G3 and G4.

Alternatively, the gain may be set using external resistors with a similar Temperature Coefficient of Resistance (TCR) as the internal resistors. This can be accomplished by using resistors made of p+ doped silicon, a material similar with the one used for the semiconductor bridge resistors. By controlling the doping level, the TCR of such resistors can be made to substantially match the internal resistors of the ASIC. The external silicon resistors with a matched TCR can be made as a network with selectable connections, in order to generate the value required for an individual transducer.

According to an aspect of the present invention, an SOI material system may be used to implement an Application Specific Integrated Circuit (ASIC) that, together with a suitable SOI sensor, will accomplish all the functions required for a transducer interface, and result in a high temperature transducer. Such a transducer is expected to operate in a temperature range that includes temperatures greater than +250° C. (+482° F.).

Those of ordinary skill in the art may recognize that many modifications and variations of the present invention may be implemented without departing from the spirit or scope of the invention. Thus, it is intended that the present invention covers the modifications and variations of this invention.

What is claimed is:

1. A silicon-on-insulator (SOI) based high temperature pressure sensing system (transducer) comprising:
    a SOI type pressure sensing piezoresistive sensor;
    a SOI Application Specific Integrated Circuit (ASIC);
    a metallization layer suitable for high temperature operation used for the contacts of said sensor and said ASIC;
    a gain controller circuit comprising a plurality of resistances that when selectively coupled to said amplifier adjust a gain of said amplifier, wherein said amplifier circuit and gain controller circuit have analogous temperature dependent operating characteristics that offset one another; and
    at least one off-substrate resistance coupled to said resistances, wherein circuit techniques mitigate the effect of the temperature mismatch of the at least one off-substrate resistance and the temperature dependent operating characteristics of said amplifier.

* * * * *

UNITED STATES PATENT AND TRADEMARK OFFICE
CERTIFICATE OF CORRECTION

PATENT NO. : 7,451,655 B2
APPLICATION NO. : 11/709639
DATED : November 18, 2008
INVENTOR(S) : Kurtz et al.

Page 1 of 1

It is certified that error appears in the above-identified patent and that said Letters Patent is hereby corrected as shown below:

Title Page, Item (73) Assignee, replace "Product" with --Products--

Signed and Sealed this

Sixth Day of January, 2009

JON W. DUDAS
*Director of the United States Patent and Trademark Office*